United States Patent
Gerten et al.

(10) Patent No.: US 6,760,319 B1
(45) Date of Patent: Jul. 6, 2004

(54) FIXED FREQUENCY INTERFERENCE AVOIDANCE ENHANCEMENT

(75) Inventors: Leo Joseph Gerten, Hoffman Estates, IL (US); Kevin Alan Harnist, Arlington Heights, IL (US); Mark Robert Mahoney, Schaumburg, IL (US); Chuck Bromley Harmke, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 707 days.

(21) Appl. No.: 09/610,022

(22) Filed: Jul. 5, 2000

(51) Int. Cl.[7] .............................................. H04J 13/06
(52) U.S. Cl. ..................... 370/335; 370/342; 370/441; 375/132
(58) Field of Search ............................... 370/320, 329, 370/332, 335, 441; 375/132

(56) References Cited

U.S. PATENT DOCUMENTS 4,556,982 A * 12/1985 Dunn ......................... 375/224
5,715,295 A * 2/1998 Yamashita .................. 455/455
5,737,359 A * 4/1998 Koivu ......................... 375/133
5,937,002 A * 8/1999 Andersson et al. ......... 375/131

* cited by examiner

Primary Examiner—Kenneth Vanderpuye
Assistant Examiner—Joshua Kading (57) ABSTRACT

A system and method is provided for removing channels in a frequency hopping scheme having strong interference or interferers in a wireless communication system. The present invention employs signal strength measurements on N number channels of the frequency hopping scheme to determine M number of channels to be avoided. The system and/or method then modifies the frequency hopping scheme to avoid transmission over the M channels. The M channels to avoid can be communicated to wireless units involved in the communication system, so that the members of the wireless communication system can frequency hop together over the modified frequency hopping scheme.

7 Claims, 8 Drawing Sheets

FIXED FREQUENCY INTERFERENCE AVOIDANCE ENHANCEMENT

TECHNICAL FIELD

The present invention generally relates to communication systems, and in particular to a system and method for improving noise and interference immunity in a wireless communication system.

BACKGROUND OF THE INVENTION

Recently a standard for short range wireless communication has evolved known as the Bluetooth standard (see www.bluetooth.com). Bluetooth is a Radio Frequency (RF) specification for short range, point to multi-point voice and data transfers. Bluetooth can transmit through solid, non-metal objects. It has a nominal link range from 10 centimeters to 10 meters, but can be extended to 100 meters by increasing the transmit power. It is based on short-range radio links and facilitates ad hoc connections for stationary and mobile communication environments. The Bluetooth standard is a low-cost short range wireless communication standard that typically operates in the 2,400–2,483.5 MHz industrial, scientific and medical (ISM) band. The ISM band is available worldwide and allows unlicensed operation of spread spectrum systems. The Bluetooth standard is often employed for short-distance connections and can be employed to replace cables used today that, for example, connect laptops to cellular telephones, printers, desktops, fax machined, joysticks and many other digital device that can be part of the Bluetooth system. Bluetooth can also provide a bridge to existing data networks. Bluetooth is specifically designed to provide low-cost, robust, efficient, high capacity, ad hoc voice and data networking.

Bluetooth technology has been designed to operate in noisy radio frequency environments and uses a fast acknowledgment and frequency hopping scheme to make a robust communications link. Bluetooth radio modules attempt to avoid interference from other signals by hopping to a new frequency after transmitting or receiving a packet as compared to other systems operating at the same frequency band. The implementations of faster hops and shorter packets limit impact of microwave and other sources of interference. Bluetooth uses forward error correction to limit impact of random noise on longer distance link.

In Bluetooth Synchronous Connection Oriented (SCO) links there is no provision for re-sending lost data; and each time a receiver hops to a blocked channel, up to 3.75 milliseconds of sequential audio may be unrecoverable. The lost packets due to fixed interferers are compounded with lost packets from FHSS (Frequency Hopped Spread Spectrum) interference from other FCC (Federal Communications Commission) devices operating in the vicinity to produce noticeably degraded audio for the user. For Bluetooth Asynchronous Connection-Less (ACL) links, different levels of error correction and detection can be put in place to protect against lost or bad data. However, in any case, the error correction or detection often results in reduced bit rate. Other standards in the ISM band also have similar problems associated with channels with strong interference or noisy fixed interferers.

DETAILED DESCRIPTION OF THE INVENTION

The present invention relates to a system and method for removing channels in a frequency hopping scheme having strong interference or interferers in a wireless communication system. The present invention employs signal strength measurements on N number of channels (N being an integer) of the frequency hopping scheme to determine M number of channels (M being an integer less than or equal to N) to avoid. The system and/or method then modify the frequency hopping scheme to avoid transmission over the M channels. The M channels to avoid can be communicated to wireless units involved in the communication system, so that the members of the wireless communication system can frequency hop together over the modified frequency hopping scheme. The frequency hopping scheme can be modified by providing a first register bank storing synthesizer codes for generating frequency hopping over the N total channels in normal mode with an alternate register bank storing synthesizer codes for generating frequency hopping over N-M channels for interference avoidance mode. Alternatively, the frequency hopping scheme can be modified by substituting guardband channels for channels with strong interference or interferers. A combination of the substitution of guardband channels arid a reduced alternate register bank can also be employed to provide the modified frequency hopping scheme.

The present invention will be described with reference to a system and method for removal of channels having strong interference or interferers on certain channels employed by a frequency hopping scheme in a wireless radio communication system. An example of a system and method will also be provided directed to a wireless communication system employing the Bluetooth standard in at least one piconet. It is to be appreciated that the system and/or method of the present invention may be employed in wireless radio communication systems that utilize other communication standards (e.g., IEEE 802.11). It is also to be appreciated that by removing channels with interferers from the hop sequence where it is known that a packet would be lost or degraded, effectively increases the number of devices that may operate in a given area or the range that devices operate at to still achieve a desired audio quality.

Figure 1:
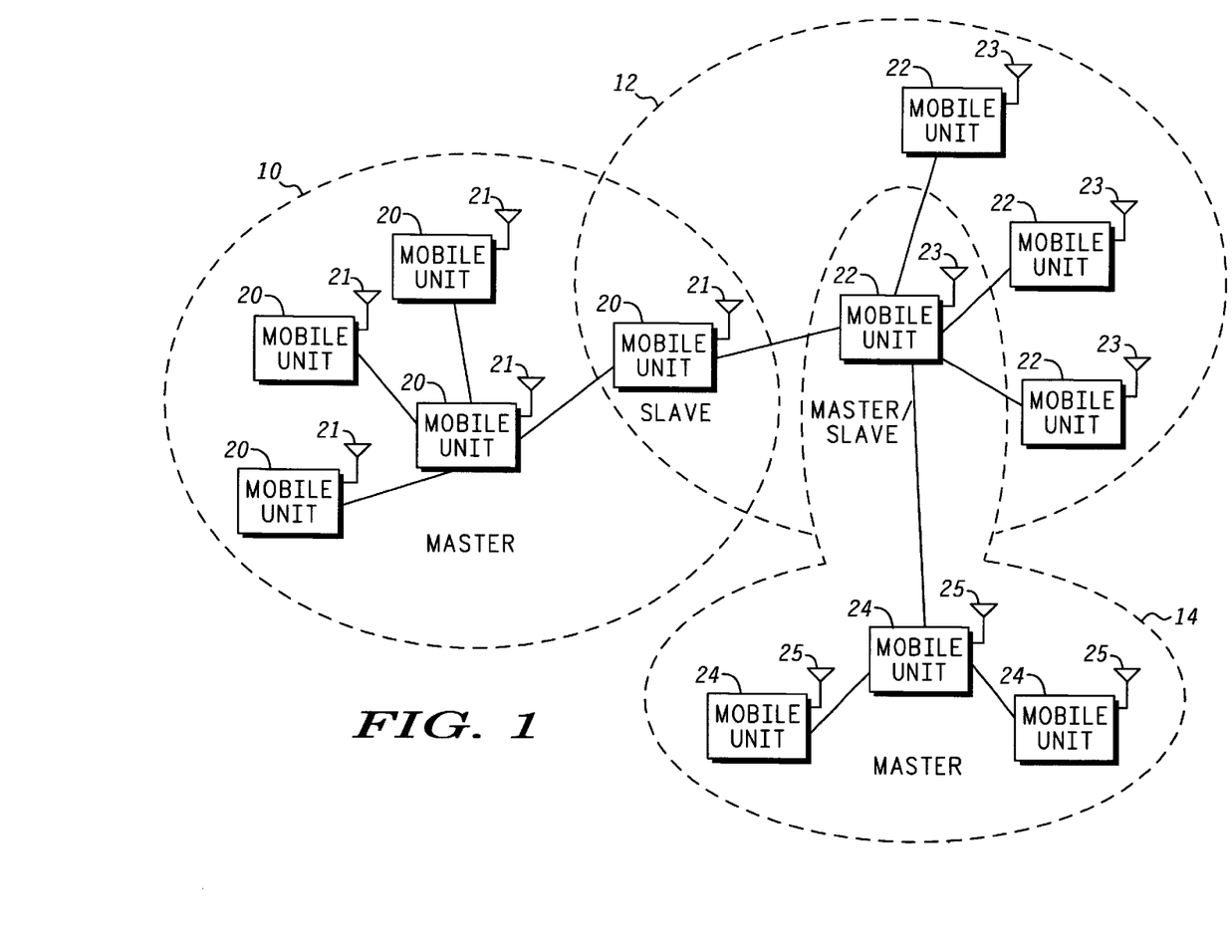
FIG. 1 illustrates a system diagram of a scatternet employing the Bluetooth standard in accordance with the present invention.

FIG. 1 illustrates operation of three piconets 10, 12 and 14 forming a scatternet. Each piconet contains a plurality of wireless mobile communication units. A piconet is a collections of devices that can be connected via Bluetooth technology in an ad hoc fashion. A piconet can start with two connected devices, such as a portable PC and cellular phone, and may grow to eight connected devices. Each Bluetooth device is a peer unit and has substantially identical implementations. However, when establishing a piconet, one unit will act as a master for synchronization purposes and the other as a slave for the duration of the piconet connection. Two or more independent non-synchronized piconets that communicate with each other are known as a scatternet. A slave as well as a master unit in one piconet can establish a connection by becoming a slave in another piconet. A master unit is a device in a piconet whose clock and hopping sequence are employed to synchronize other devices in the piconet—devices in a piconet that are not the master are typically slaves.

A first piconet 10 is formed with a plurality of mobile units 20 each wirelessly communicating with one another through an antenna 21. The first piconet 10 includes a master mobile unit and a slave mobile unit that is also a slave of a second piconet 12. The second piconet 12 includes a number of mobile units 22 wireless communicating with one another through an antenna 23. The second piconet 12 includes a master mobile unit that is also a slave unit of a third piconet 14. The third piconet 14 includes a number of mobile units 24 wireless communicating with one another through an antenna 25. The present invention may be employed in other radio networking connections based on the particular standard being employed.

Figure 2:
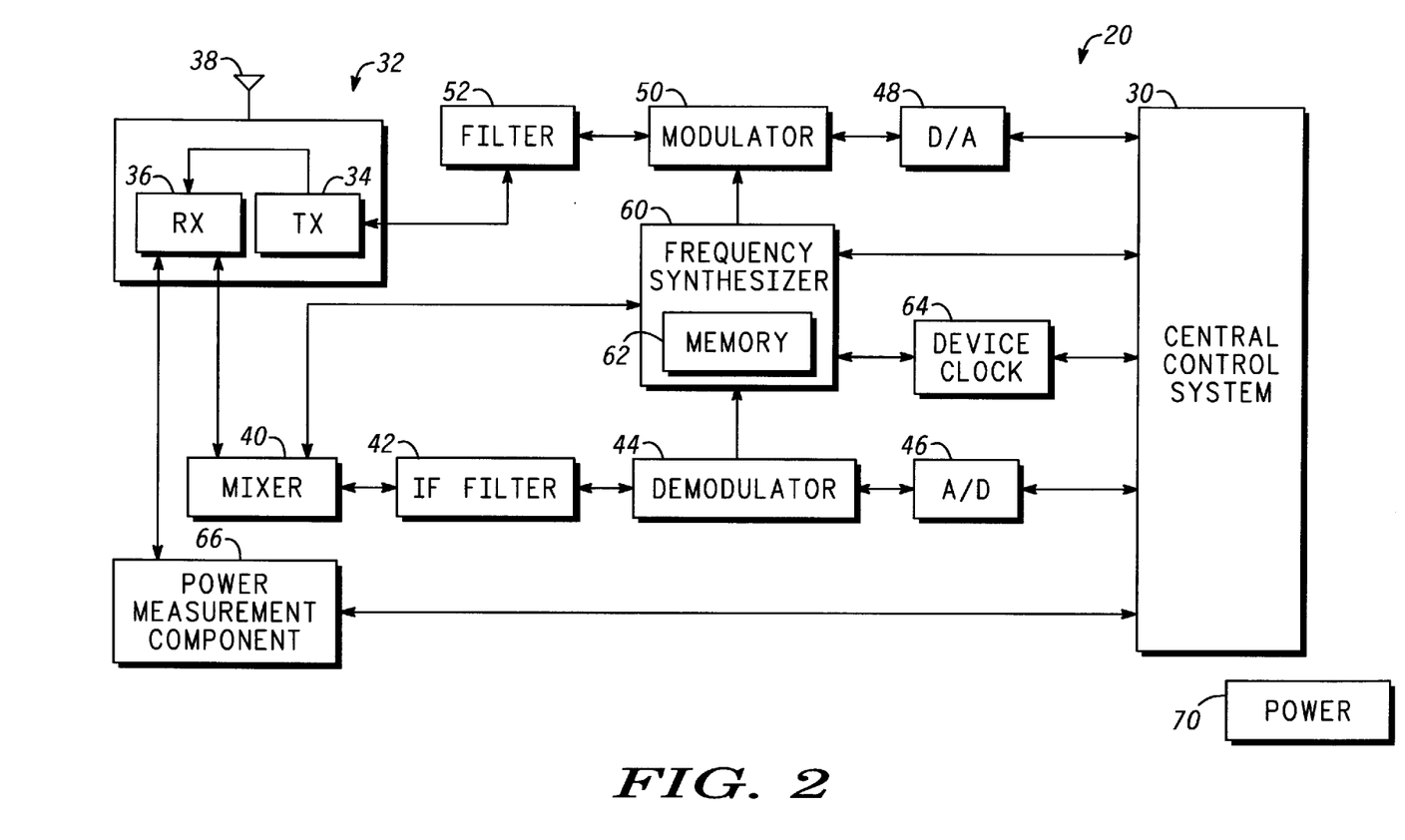
FIG. 2 illustrates a block schematic diagram of a mobile communication unit in accordance with the present invention.

Referring now to FIG. 2, a schematic representation of the mobile communication unit 20 is shown according to one particular aspect of the present invention, wherein a central control system 30 is responsible for controlling general operations of the mobile communication unit 20. The central control system 30 can include a processor or the like that is programmed to control and operate various components within the mobile communication unit 20 in order to carry out various functions described herein. The manner in which the processor can be programmed to carry out the functions relating to the present invention will be readily apparent to those having ordinary skill in the art based on the description provided herein.

The mobile communication unit 20 includes a transceiver 32 having transmitting circuitry 34 and receiving circuitry 36 that are both coupled to an antenna 38. The receiver 36 receives transmissions through the antenna 38, which is converted by a mixer 40, filtered by an intermediate frequency (IF) filter 42 and demodulated by a demodulator 44. The transmission is then digitized through an A/D converter 46 for processing by the central control system 30. Transmissions are transmitted from the central control system 30 through a D/A converter 48 to a modulator 50 and a filter 52 to the transmitter 34 out through the antenna 38. A frequency synthesizer component 60 contains a memory component 62. The frequency synthesizer component 60 cooperates with the central control system 30 and a device clock 64 to provide frequency hopping for the mobile communication unit 20. The memory component 62 may include a plurality of register banks for storing synthesizer codes that are employed to facilitate frequency hopping. Alternatively, the register banks may reside in the central control system 30 (e.g., in a memory component, onboard registers or memory in a processor or in separate register components). The frequency synthesizer component 60 is also operatively coupled to the modulator 50, the demodulator 44 and the mixer 40 to provide a frequency oscillation component for transmitting and receiving communications. A power measurement component 66 is operatively coupled to the receiver 34 and provides transmission power measurement information to the central control system 30. Power is provided to the central control system 30 and other components forming the mobile communication unit 20 by a power component 70, such as a battery power module, line power or the like, for example.

The present invention provides for elimination of M channels with high interference of N total channels being transmitted in a frequency hopping scheme in a wireless communication system, such as a piconent or the like. Presently, the Bluetooth standard and the IEEE 802.11 standard provide for frequency hopping between seventy nine channels, while the FCC requires frequency hopping with at least seventy five channels. The present invention will be described by example with respect to elimination of transmissions over channels having four worst interferers amongst seventy nine channels in a Bluetooth piconet. However, it is to be appreciated that the number of channels for different standards may vary as well as the number of channels in the above standards being subject to change. Therefore, the invention is not limited to the example(s) discussed herein and many variations with respect to elimination of transmissions over channels having strong interferers over different or modified standards in a wireless communication system are contemplated by the present invention, and are intended to fall within the scope of the hereto appended claims.

Figure 3:
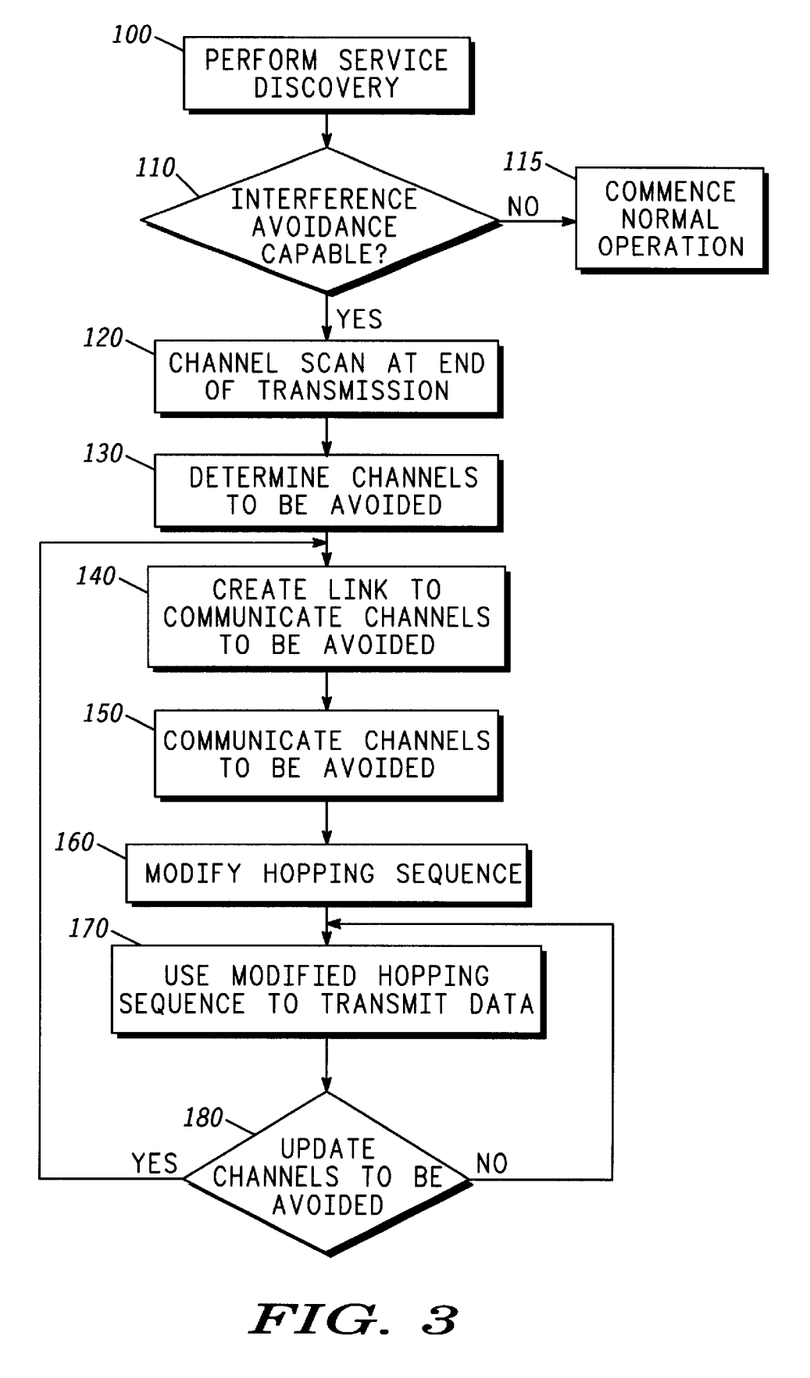
FIG. 3 is a flow diagram illustrating a methodology for determining and communicating channels to be avoided to a remote device in accordance with the present invention.

FIG. 3 is a flow diagram illustrating one particular methodology for communicating channels to be avoided in accordance with the present invention. In step 100, a master device performs a service discovery request to determine if a remote device has interference avoidance capabilities. In step 110, the master device determines if the remote device has interference avoidance capabilities. If the remote device does not have interference avoidance capabilities (NO), the master device and the remote device commence normal operation in step 115. If the remote device does have interference avoidance capabilities (YES), the master device performs a channel scan at completion of its last transmission (step 120) and determines which channels have strongest interference in step 130. The master device establishes a link to communicate channels to be avoided in step 140. The master device then communicates the channels to be avoided to the remote device at step 150. In step 160, the master device and the remote device modify their respective hopping sequences. In step 170, the master device and the remote device begin transmitting data at the modified hopping sequences. In step 180, the master device periodically updates the channels to be avoided. If the master does not update the channels to be avoided (NO), the master device and the remote device continue transmitting data at the modified hopping sequences in step 170. If the master does update the channels to be avoided (YES), the master device returns to step 140 to create another link and communicate the new channels to the remote device.

The above process can be applied to a Bluetooth example and includes identification of a Bluetooth device's ability to support interference avoidance, the measurements of signal strength on all channels and identification of which channel should not be used without violating the FCC rules, a method of modifying the Bluetooth hop sequence so that it will avoid channels containing strong or fixed interferers while still supporting standard Bluetooth hopping with other non-enabled members of the piconet and a method of relating necessary interference avoidance information to the remote Bluetooth devices.

Once a connection is made between a master and slave in a piconet, a Bluetooth service discovery protocol (SDP) can be used to relay capability of the slave device to participate in interference avoidance. This is accomplished by one device querying service records of another device to determine if the remote device supports interference avoidance. Interference avoidance capable devices will create a service record identifying the service and store that record in an SDP server database.

Figure 4:
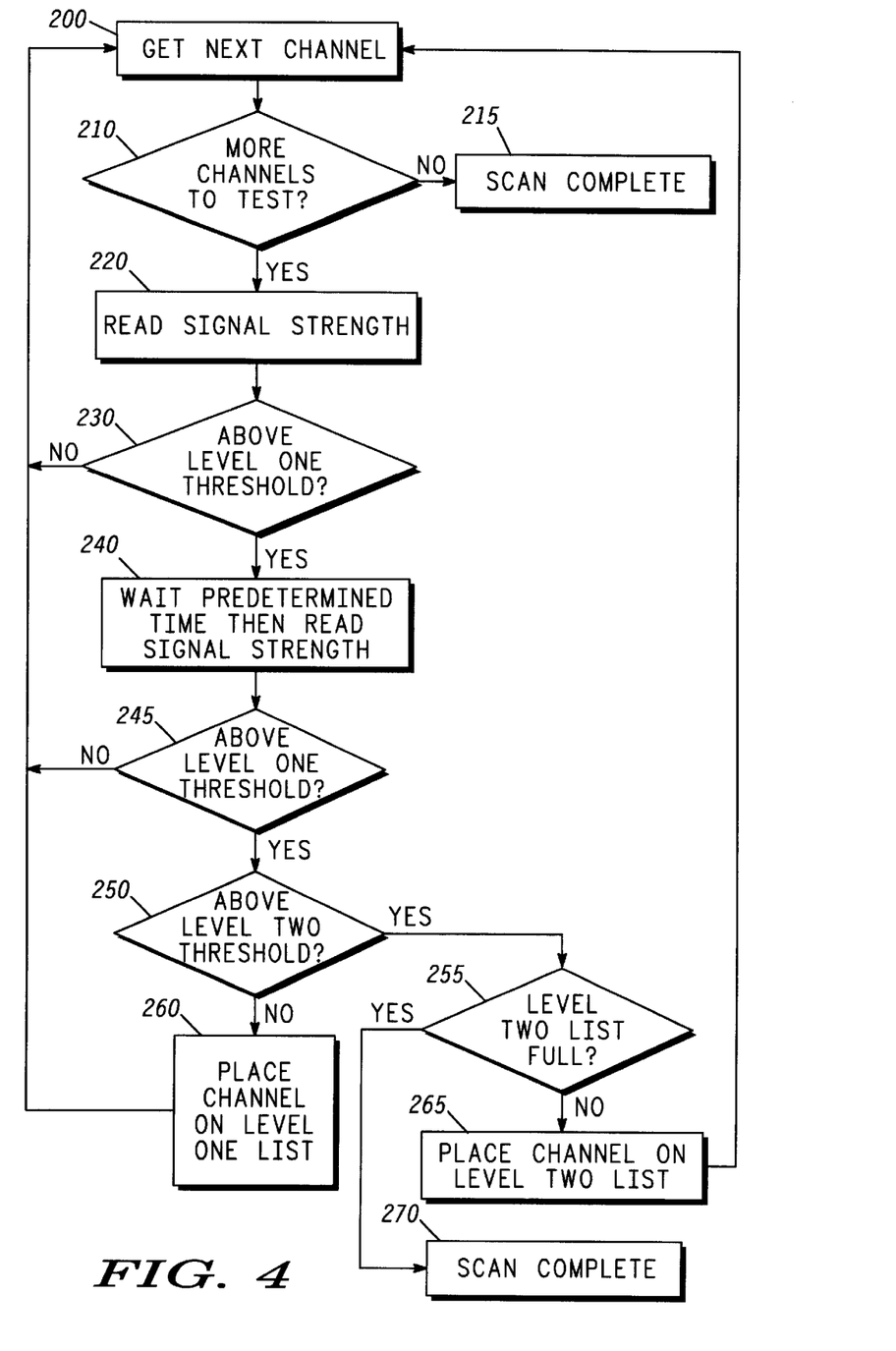
FIG. 4 is a flow diagram illustrating a methodology for determining channels with interferers above a certain threshold in accordance with the present invention.

In order to identify channels with fixed interferers in step 130, an identification algorithm may be employed. The identification algorithm can use hardware (e.g., measurement power component 66) and software (e.g., residing in central control system 30) to read signal strength of channels and determine which channels to avoid. FIG. 4 is a flow diagram illustrating one particular methodology for determining channels with interferers above a certain threshold according to step 130 of FIG. 3. In step 200, a master device obtains a next channel in a list of channels to determine signal strength of that channel. In step 210, the master device determines if there are any additional channels to scan. If the master device does not have additional channels to scan (NO), the scan is completed as illustrated in step 215. If the master device does have additional channels to scan (YES), the master device advances to step 220 where the master device determines signal strength of the channel. In step 230, the master device determines if the signal strength of the channel is above a level one threshold. If the signal strength of the channel is not above a level one threshold (NO), the process/algorithm returns to step 200 to obtain the next channel. If the signal strength of the channel is above a level one threshold (YES), the process/algorithm advances to step 240. In step 240, the master device waits a predetermined period and then determines signal strength of the channel a second time. In step 245, the master device determines if the signal strength of the channel is above a level one threshold. If the signal strength of the channel is not above a level one threshold (NO), the process/algorithm returns to step 200 to obtain the next channel. If the signal strength of the channel is above a level one threshold (YES), the process/algorithm advances to step 250. In step 250, the master device determines if the signal strength of the channel is above a level two threshold. If the signal strength of the channel is not above a level two threshold (NO), the channel is placed on the level one list in step 260 and the process/algorithm returns to step 200 to obtain the next channel. If the signal strength of the channel is above a level two threshold (YES), the process/algorithm advances to step 255. In step 255, the process/algorithm determines if the level two list is full. If the level two list is full (YES), the scan is complete in step 270. If the level two list is not full (YES), the channel is placed on the level two list in step 265 and the process/algorithm returns to step 200 to obtain the next channel.

In the Bluetooth example, an exemplary channel scanning algorithm can include reading signal strength of all 79 Bluetooth available channels. In an alternate aspect of the invention, the signal strength is read from all 79 Bluetooth available channels plus guardbands around the 79 Bluetooth channels so as to cover the full 2.4 GHz ISM band. The guardbands around the 79 Bluetooth channels are channels that are still within the ISM band but not employed by the Bluetooth standard. For the Bluetooth standard, this includes a first guardband at a frequency of 2.401 GHZ before a bottom frequency of the Bluetooth standard and three additional guardbands at frequencies of 2.481 GHZ, 2.482 GHZ and 2.483 GHZ above a top frequency of the Bluetooth standard. It is to be appreciated that other standards also include guardband frequencies, such as the IEEE 802.11 standard.

For example, in a two-way radio implementation during transmission of a voice audio signal from a device such as a microphone pin coupled to the two-way radio or a remote device, a manner in which to identify channels that should be avoided is to leave the two-way radio keyed for an additional fraction of a second (typically on the order of 0.1 second) at the end of a transmission. When a call is initiated from the microphone pin, which is a remote Bluetooth audio device (RBA), the RBA keys the two-way radio for the duration of the audio transmission across the Bluetooth channel. The digital Bluetooth audio from the remote device is decoded and enters the two-way radio as analog audio via the accessory microphone pin. The only change to this normal procedure is that at the end of the Bluetooth audio transmission, the RBA will leave the radio keyed for an additional fraction of a second. During this time the RBA's receiver is free to sweep the ISM band for interferers and determine which are fixed. In this manner, the following channel scanning algorithm will include ISM band interferers generated by the two-way radio during transmit.

The order in which channels can be scanned is equivalent to stepping through a code word bank of registers starting at index zero and proceeding to index seventy-eight (channels 0, 2, 4, . . . 74, 76, 78, 1, 3, 5, . . . 73, 75, 77). Optionally, the guardbands then can be scanned. If the signal strength of a particular channel does not exceed a certain threshold, which is referred to as Level 1, then it may be concluded that the channel in question will not significantly interfere with normal transmissions. If the signal strength does surpass the Level 1 threshold then the signal strength of that channel will be measured again 3.125 milliseconds later (the longest Bluetooth packet will take 3.125 milliseconds to transmit). If the signal strength does not exceed the Level 1 threshold on the second measurement then the channel does not contain a fixed interferer and the channel scanning algorithm will move on to the next channel to be scanned, thus avoiding identifying a hopping signal from another device as a candidate for removal. If on the second measurement the signal strength is above a different, higher threshold, which will is referred to as Level 2, then it is placed on an index of the channel on a list of Level 2 interferers called Level_2_List, otherwise it will be placed on a list of Level 1 interferers called Level_1_List. Entries into the Level_1_List may be overwritten by other interferers if the Level_1_List becomes full. This procedure can be repeated until all the channels have been considered or the Level_2_List is full.

In the Bluetooth example, additional channels can be added to the list of interferers if the appropriate number of interferers above a certain threshold is not identified. For example, if there were not four channels listed in the Level_2_List after the scan is complete, then the remaining slots available in the Level_2_List will be filled with the channel immediately before and after a channel already on the Level_2_List (the adjacent channel C/I is 0 dB for a Bluetooth radio). If there are not four indices in the Level_2_List after the addition of the adjacent channels, then the remaining Level_2_List can be replaced with channels in the Level_1_List until there are no more channels in the Level_1_List.

Figure 5:
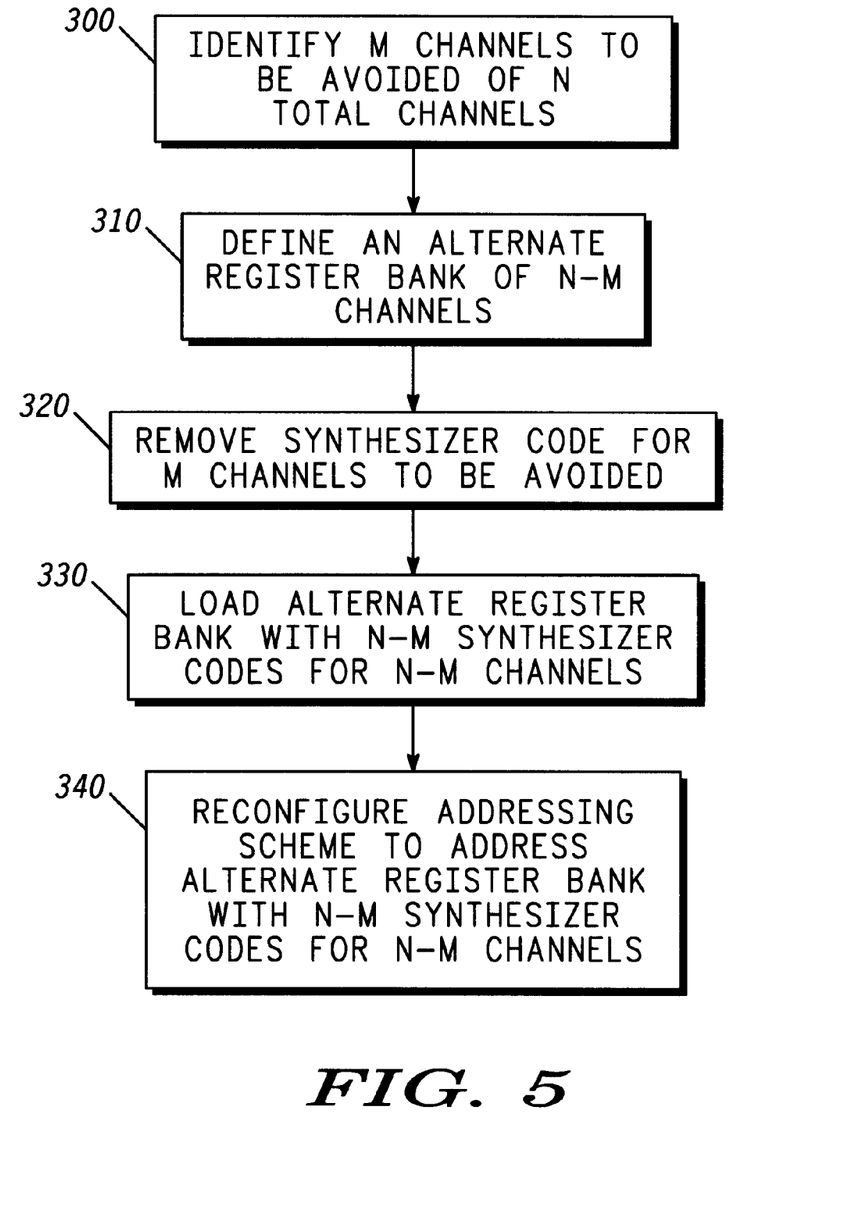
FIG. 5 is a flow diagram illustrating a methodology for modifying the hopping sequence in a wireless communication system in accordance with the present invention.

FIG. 5 is a flow diagram illustrating one particular methodology for modifying the hopping sequence of the master and slave device as illustrated in step 160 of FIG. 3. In step 300, the master device and the slave device identify M channels to be avoided among N total channels. In step 310, both the master device and the slave device define an alternate register bank of N-M channels. In step 320, the synthesizer code words for the M channels to be avoided are removed. In step 330, the alternate register bank is loaded with N-M synthesizer code words for the N-M channels with the synthesizer code words for the M channels to be avoided removed. In step 340, the address scheme is reconfigured for addressing the alternate register bank with N-M synthesizer codes for N-M channels.

In the Bluetooth example, the above methodology can seek to reduce the level of interference in a Bluetooth system by identifying the 4 strongest interferers, removing these synthesizer code words from a length-79 register bank, creating a new length-75 register bank. The synthesizer code words within the length-75 register bank can be ordered so that a length-32 segment still spans 64 MHz as is conventional in a length-79 register bank. It is to be appreciated that the above reconfigured addressing scheme can be employed, so as to skip addressing of the 4 strongest interferers in the length-79 register bank. However, a simpler and less time consuming methodology would be to reduce the length 79-register bank to a length 75-register bank.

Figure 6:
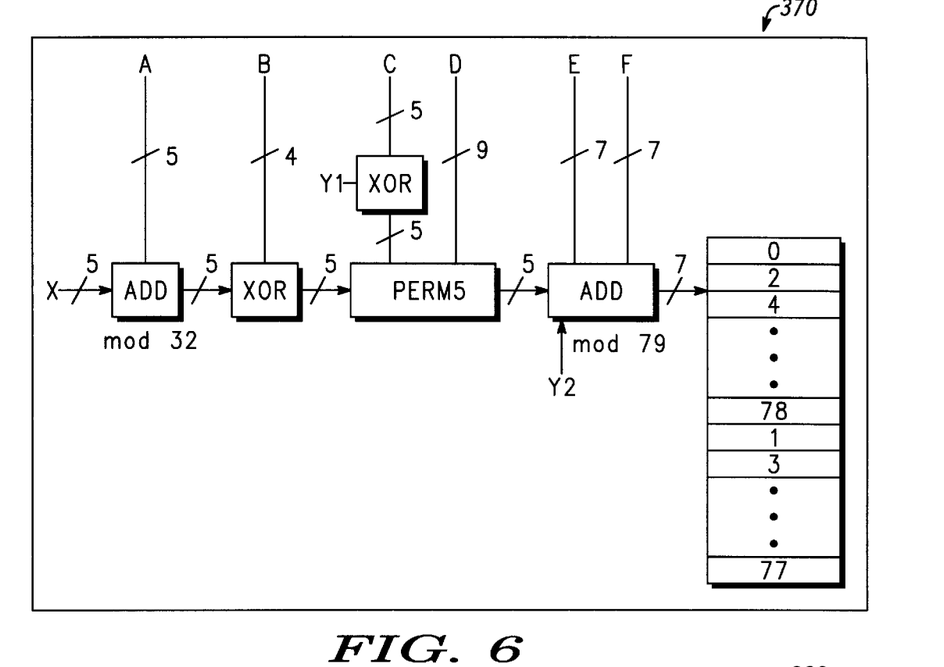
FIG. 6 is a block schematic diagram of a hop selection kernel having a modulo of 79 for a wireless communication device employing the Bluetooth standard in accordance with the present invention.
Figure 7:
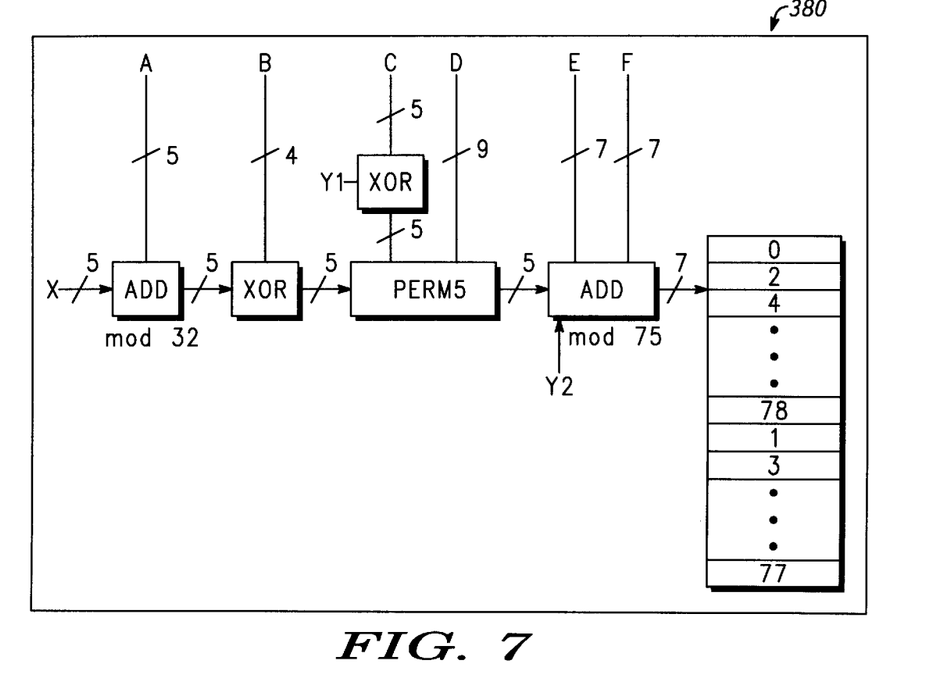
FIG. 7 is a block schematic diagram of a modified hop selection kernel having a modulo of 75 for a wireless communication device employing the Bluetooth standard in accordance with the present invention.

FIG. 6 illustrates a hop selection kernel 370 for a 79-hop system as illustrated in the Bluetooth specification, while Table 1 below illustrates how each of the control signals used by the selection kernel is determined for a 79-hop system. During the connection state the control signals (X, Y1, Y2, A, B, C, D, E, F) are derived from the 27 MSB's (Most Significant Bits) of the CLK signal and the 28-bit address of the master as per Table 1. The control signals are used to determine addresses to a bank of 79 registers in segments of 32. However, after the 4 worst interferers have been identified the register bank will have been shortened to length-75, meaning that the hop selection kernel must be modified so that it generated addresses to a bank of 75 registers, instead of 79, still in segments of 32. Referring to Table 1, the first change (of two changes) is to generate control signal F modulo 75 instead of modulo 79 as shown in Table 1. The second change (of two changes) is to change the modulo of the final add operation from 79 as shown in FIG. 6 to 75 as shown in FIG. 7 to generate a modified hop selection kernel 380 illustrated in FIG. 7. The modulo operation is well known to those skilled in the art and implementation of the hop selection kernel and the modulo operation can be employed via hardware and/or software.

TABLE 1

| | Page scan/<br>Inquiry scan | Page/<br>Inquiry | Page response<br>(master/slave) | Connection<br>state |
|---|---|---|---|---|
| X | $CLKN_{16-12}$ | $Xp_{4-0}^{(79)}/$<br>$Xi_{4-0}^{(79)}$ | $Xprm_{4-0}^{(79)}/$<br>$Xprs_{4-0}^{(79)}$ | $CLK_{6-2}$ |
| Y1 | 0 | $CLKE_1/CLKN_1$ | $CLKE_1/CLKN_1$ | $CLK_1$ |
| Y2 | 0 | $32 \times CLK_1/$<br>$32 \times CLKN_1$ | $32 \times CLKE_1/$<br>$32 \times CLKN_1$ | $32 \times CLK_1$ |

TABLE 1-continued

| | Page scan/<br>Inquiry scan | Page/<br>Inquiry | Page response<br>(master/slave) | Connection<br>state |
|---|---|---|---|---|
| A | $A_{27-23}$ | $A_{27-23}$ | $A_{27-23}$ | $A_{27-23}$<br>$\oplus CLK_{25-21}$ |
| B | $A_{22-19}$ | $A_{22-19}$ | $A_{22-19}$ | $A_{22-19}$ |
| C | $A_{8, 6, 4, 2, 0}$ | $A_{8, 6, 4, 2, 0}$ | $A_{8, 6, 4, 2, 0}$ | $A_{8, 6, 4, 2, 0} \oplus$<br>$CLK_{20-16}$ |
| D | $A_{18-10}$ | $A_{18-10}$ | $A_{18-10}$ | $A_{18-10} \oplus CLK_{15-7}$ |
| E | $A_{13, 11, 9, 7, 5, 3, 1}$ | $A_{13, 11, 9, 7, 5, 3, 1}$ | $A_{13, 11, 9, 7, 5, 3, 1}$ | $A_{13, 11, 9, 7, 5, 3, 1}$ |
| F | 0 | 0 | 0 | $16 \times CLK_{27-3}$<br>mod 79 |

The hop selection kernel in FIG. 7 starts by adding X and A modulo 32. The 4 LSB's (Least Significant Bits) of the result are then exclusive OR'd with B while the MSB is carried through unchanged. The 5-bit result enters the PERM5 block, which consists of seven stages of 2×2-bit butterflies (implemented as multiplexers) controlled by D (9-bits) concatenated with the output of Y1 (1-bit) exclusive OR'd with every bit of C (5-bits), resulting in a 14-bit control word. $P_{0-8}$ corresponds to $D_{0-8}$, $P_{9-13}$ which corresponds to the result of Y1 (1-bit) exclusive OR'd with every bit of C (5-bits), and Y1 and Y2 selects between master-to-slave and slave-to-master transmission. The 5-bit result is then added to E, F, and Y2 modulo 75. This result is then used to address the register bank.

Figure 8:
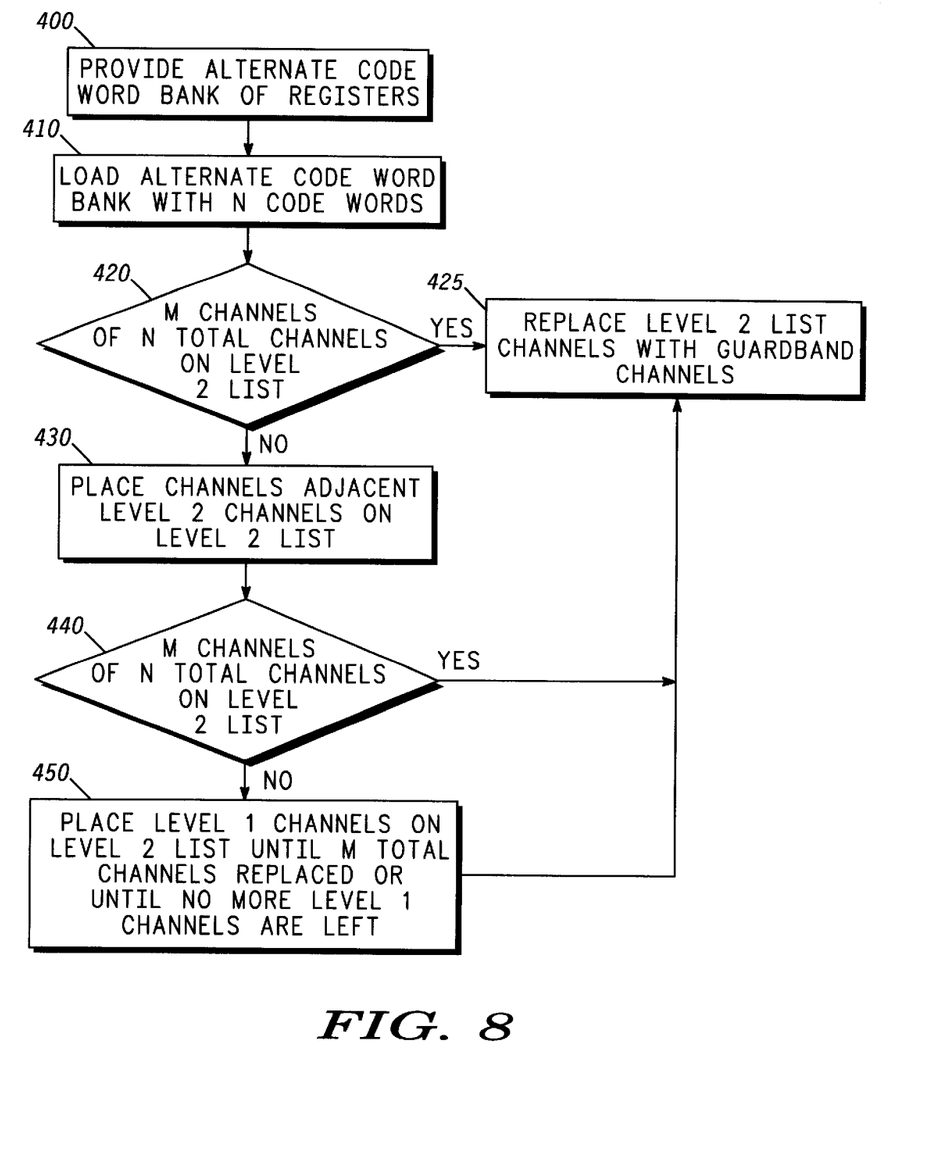
FIG. 8 is a flow diagram illustrating another methodology for modifying the hopping sequence in a wireless communication system in accordance with the present invention.

FIG. 8 is a flow diagram illustrating another particular methodology for modifying the hopping sequence of the master and slave device as illustrated in step 160 of FIG. 3. After the master device and slave identify M channels to be avoided of N total channels, both the master device and the slave device define an alternate code word register bank in step 400. In step 410, the alternate code word register bank is loaded with N synthesizer code words. In step 420, the methodology determines if M channels of N total channels are on the level 2 list. If M channels of N total channels are on the level 2 list (YES), the channels on the level 2 list are replaced with guardband channels in step 425. If M channels of N total channels are not on the level 2 list (NO), channels adjacent to the level 2 channels are selected and placed on the level 2 list in step 430 until M channels are on the level 2 list. In step 440, the methodology determines if M channels of N total channels are on the level 2 list. If M channels of N total channels are on the level 2 list (YES), the channels on the level 2 list are replaced with guardband channels in step 425. If M channels of N total channels are not on the level 2 list (NO), level 1 channels are placed on the level 2 list in step 450, until M total channels are replaced or until there are not anymore channels on the level 1 list. The methodology then advances to step 425 where the channels on the level 2 list are replaced with guardband channels.

The above proposed method can be implemented with respect to the Bluetooth example by replacing bad channels with channels outside the specified 79 channels (in the guardbands) repeatedly to produce a uniform distribution of hop frequencies. First, an alternate bank of registers containing the synthesizer code words associated with the hop frequencies would be produced that is identical to the original bank of registers as specified by Bluetooth. This alternate bank of registers can be referred to as IA_Array. The channel scanning algorithm will have produced one list of possible indices associated with channels to be avoided called Level_2_List. While there are still entries in the Level_2_List, the IA_Array can be changed with respect to the elements corresponding to the interfered with channels with synthesizer code words corresponding to frequencies just outside the normal channels (e.g., the guardband channels). Then before a packet is sent the destination device, it is checked to see if it has an agreement with the local device (a table of AM_ADDR's can be created identifying which remote devices are participating). If there is an agreement between the devices, then the IA_Array will be addressed instead of the original bank of registers. Before another channel scan is performed, the Level_2_List can be used to put the original values back in the IA_Array to prepare for the next set of interfered with channels.

In another aspect of the invention, the guardband channels are included in the channels being scanned when determining channels to avoid. In the Bluetooth example, eighty three channels can be scanned and the four worst channels avoided. In this methodology the alternate register bank can include 79 channels. Alternatively, eighty three channels can be scanned and the eight worst channels avoided. In this methodology the alternate register bank can include 75 channels with an alternate addressing scheme.

Figure 9:
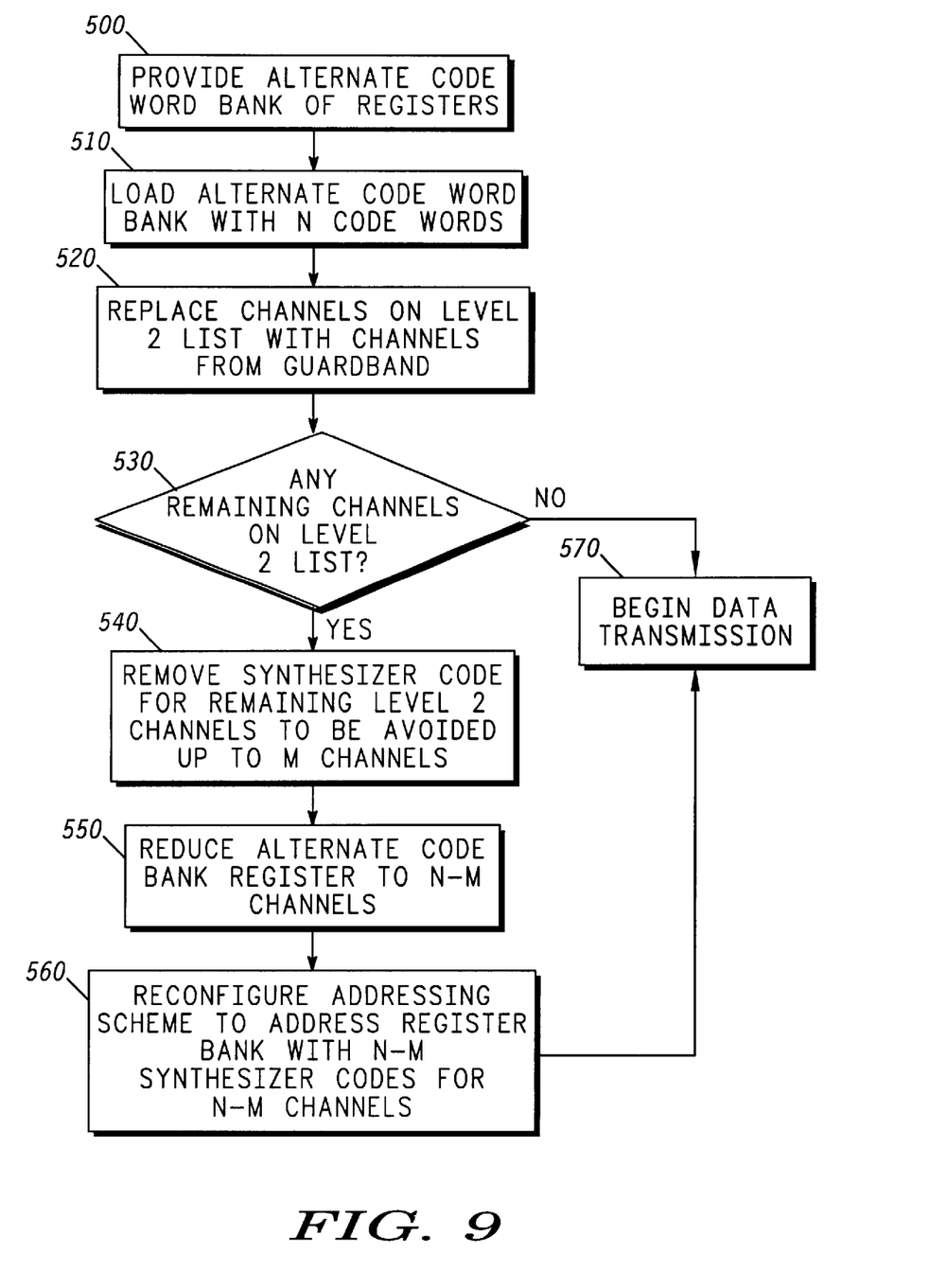
FIG. 9 is a flow diagram illustrating yet another methodology for modifying the hopping sequence in a wireless communication system in accordance with the present invention.

FIG. 9 is a flow diagram illustrating yet another particular methodology for modifying the hopping sequence of the master and slave device as illustrated in step 160 of FIG. 3. After the master device and slave identify M channels to be avoided of N total channels, both the master device and the slave device both define an alternate code word register bank in step 500. In step 510, the alternate code word register bank is loaded with N synthesizer code words. In step 520, the level 2 channels are replaced with guardband channels. In step 530, the methodology determines if there are any remaining channels on the level 2 list. If there are not any remaining channels on the level 2 list (NO), the master and slave will begin transmission in step 570 If there are any remaining channels on the level 2 list (YES), the synthesizer code is removed for the remaining channels on the level 2 list up to M channels in step 540. The methodology then advances to step 550 where the alternate code bank register is reduced to N total channels–M channels to be avoided. In step 560, the addressing scheme for both the master and slave device are reconfigured for N-M synthesizer codes for N-M channels.

The method of FIG. 9 is a hybrid of the methods FIG. 7 and FIG. 8. To maximize the number of channels that can be replaced in the Bluetooth example, the methods would be combined in the following manner. First, bad channels would be replaced with channels in the Bluetooth guardband, then if there are still entries left in the Level_2_List the modulo portion of the hopping algorithm would be altered as previously described.

The steps of 140–150 and 170–180 of FIG. 3 will now be discussed with respect to the Bluetooth example. Once a Bluetooth connection has been established and the master has identified the slave's capability to engage in an interference avoidance hop sequence, a link can be initiated to convey the number of channels to be avoided, their corresponding array indices and what the channels should be replaced with. If the slave identifies itself as supporting this mode through service discovery the slave can automatically be engaged in this mode. Upon reception of a packet containing the modified hop sequence data, the slave device will typically send back an acknowledgment to the master. The master and slave then alter their hop selection algorithms and begin avoiding interfered with channels. Each time the master decides to update the channels to be avoided, a new packet is sent that follows the same format and procedure as the first packet. Preferably, a master and slave can remain in the interference avoidance hop mode for the duration of their connection. If a normal hop sequence is desired for some reason, the master can send an interference avoidance data packet with zero channels to indicate that none of the channels are to be avoided.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A system for avoiding channels having relatively strong interference in a wireless communication environment formed entirely of mobile units employing a frequency hopping scheme comprising:

a power measurement component at each mobile unit adapted to scan N total channels employed in the frequency hopping scheme and measure signal strength of the N channels; a central control system component at each mobile unit operatively coupled to the power measurement component, the central control system component adapted to receive signal measurement information and modify the frequency hopping scheme to avoid transmitting through M channels of the N total channels;

a first register bank coupled to the central control system component, the first register bank storing synthesizer codes for generating frequency hopping over the N total channels and a second register bank coupled to the central control system, the second register bank storing synthesizer codes for generating frequency hopping over N-M channels; and a first hop selection kernel component for addressing the first register bank and a second hop selection kernel component for addressing the second register bank, the first hop selection kernel component having a modulo of N for addressing the first register bank and the second hop selection kernel component having a modulo of N-M for addressing the second register bank.

2. A method for avoiding channels having strong interference in a wireless communication system employing a frequency hopping scheme comprising the steps of:

determining M channels with strong interference out of N total channels in the frequency hopping scheme by scanning the N total channels to determine the signal strength of each of the N total channels and identifying M channels above a predetermined signal strength to be avoided, the step of identifying M channels above a predetermined signal strength comprising the steps of identifying channels above a first threshold and placing those channels on a first list and identifying channels above a second threshold and below the first threshold and placing those channels on a second list; and modifying the frequency hopping scheme to avoid transmitting through the M channels in the frequency hopping scheme.

3. The method of claim 2, wherein the channels on the first list are identified as channels to first avoid and then the channels on the second list are identified as channels to secondly avoid until a total of M channels are identified.

4. A method for avoiding channels having strong interference in a wireless communication system employing a frequency hopping scheme comprising the steps of:

determining M channels with strong interference out of N total channels in the frequency hopping scheme;

modifying the frequency hopping scheme to avoid transmitting through the M channels in the frequency hopping scheme; and wherein the step of modifying the frequency hopping scheme to avoid transmitting through the M channels in the frequency hopping scheme comprising the steps of defining an alternate register bank of N-M channels, removing synthesizer codes for the M channels to be avoided, loading the alternate register bank with N-M synthesizer codes and reconfiguring the address scheme to address the alternate register bank.

5. A method for avoiding channels having strong interference in a wireless communication system employing a frequency hopping scheme comprising the steps of:

determining M channels with strong interference out of N total channels in the frequency hopping scheme;

modifying the frequency hopping scheme to avoid transmitting through the M channels in the frequency hopping scheme;

wherein the step of modifying the frequency hopping scheme to avoid transmitting through the M channels in the frequency hopping scheme comprising the step of replacing the M channels with guardband channels.

6. A method for avoiding channels having strong interference in a wireless communication system employing a frequency hopping scheme comprising the steps of:

determining M channels with strong interference out of N total channels in the frequency hopping scheme;

modifying the frequency hopping scheme to avoid transmitting through the M channels in the frequency hopping scheme; and replacing the M channels with guardband channels, determining if any additional channels of the N channels besides the M channels have signal strengths above a predetermined signal strength up to M additional channels, providing an alternate bank register having N-M channels, removing synthesizer codes for the M additional channels to be avoided, loading the N-M register bank with N-M synthesizer codes and reconfiguring the address scheme to address the alternate register bank.

7. A method for avoiding channels having strong interference in a wireless communication system employing a frequency hopping scheme comprising the steps of:

determining M channels with strong interference out of N total channels in the frequency hopping scheme;

modifying the frequency hopping scheme to avoid transmitting through the M channels in the frequency hopping scheme;

wherein the wireless communication system comprises a master device and at least one slave wherein the master performs the step of determining M channels with strong interference out of N total channels in a frequency hopping scheme, and communicates the M channels to be avoided over a communication link between the master and the at least one slave and both the master and the at least one slave perform the step of modifying the frequency hopping scheme to avoid transmitting through the M channels; and the master further performing the step of determining if the at least one slave supports interference avoidance before the step of communicating the M channels to be avoided over a communication link between the master and the at least one slave.

* * * * *